United States Patent [19]

Schulz et al.

[11] Patent Number: 5,637,640

[45] Date of Patent: Jun. 10, 1997

[54] ASPHALT CEMENT MODIFICATION

[75] Inventors: Gerald O. Schulz, Stow; Daniel F. Klemmensen, Tallmadge, both of Ohio

[73] Assignee: The Goodyear Tire & Rubber Company, Akron, Ohio

[21] Appl. No.: 621,277

[22] Filed: Mar. 25, 1996

Related U.S. Application Data

[62] Division of Ser. No. 386,779, Feb. 10, 1995, Pat. No. 5,534,568.

[51] Int. Cl.$^6$ ............... C08L 33/26; C08L 33/10; C08L 9/08
[52] U.S. Cl. ............... 524/821; 524/555; 524/822; 526/304
[58] Field of Search ............... 524/555, 821, 524/822; 526/304

[56] References Cited

U.S. PATENT DOCUMENTS

| | | | |
|---|---|---|---|
| 2,830,963 | 4/1958 | Traxler et al. | 524/71 |
| 4,178,318 | 12/1979 | Cheung | 524/555 |
| 4,338,425 | 7/1982 | Dougherty et al. | 526/304 |
| 4,414,359 | 11/1983 | Dougherty et al. | 524/555 |
| 4,421,900 | 12/1983 | Hamed | 525/218 |
| 4,477,612 | 10/1984 | Boutsicaris | 524/424 |
| 4,939,200 | 7/1990 | Stack et al. | 524/501 |
| 5,002,987 | 3/1991 | Schulz | 524/60 |
| 5,023,282 | 6/1991 | Neubert | 524/59 |

*Primary Examiner*—Peter A. Szekely
*Attorney, Agent, or Firm*—Alvin T. Rockhill

[57] ABSTRACT

It has been determined that rubbery terpolymers of a conjugated diolefin monomer, a vinyl aromatic monomer, and N-(isobutoxymethyl) acrylamide (IBMA) tan be used to modify asphalt cement to greatly enhance the resistance to shoving, rutting, and low temperature cracking of asphalt concretes made therewith. These rubbery polymers have a Mooney viscosity which is within the range of about 35 to about 80. It has further been determined that these rubbery terpolymers are compatible with virtually all types of asphalt. It is particularly preferred for the rubbery polymers of this invention to also contain repeat units which are derived from hydroxypropyl methacrylate (HPMA). The subject invention more specifically relates to a modified asphalt cement which is comprised of (1) from about 90 weight percent to about 99 weight percent of asphalt; and (2) from about 1 weight percent to about 10 weight percent of a rubbery polymer which is comprised of repeat units which are derived from (a) about 64 weight percent to about 84.9 weight percent of a conjugated diolefin monomer, (b) about 15 weight percent to about 33 weight percent of a vinyl aromatic monomer, and (c) about 0.1 weight percent to about 3 weight percent of isobutoxymethyl acrylamide.

7 Claims, No Drawings

ASPHALT CEMENT MODIFICATION

This is a Divisional of application Ser. No. 08/386,779, filed on Feb. 10, 1995, now U.S. Pat. No. 5,534,568.

BACKGROUND OF THE INVENTION

The importance of roads and highways has been appreciated since the time of the Roman Empire. By about 300 B.C. the first section of the Appian Way extending from Rome to Capua was built. Some of the more than 50,000 miles of roadway ultimately built in the Roman Empire was constructed with heavy stone. However, not much progress was made in the art of road construction from the era of the Roman Empire until the development of the automobile.

For centuries stone blocks, wood blocks, vitrified brick and natural asphalt (bitumen) have been used to pave roads and highways. However, at the beginning of the automobile era, most rural roadway surfacing consisted of broken stone or gravel. Such roads were often rough, dusty and clearly inadequate for modern automobile and truck traffic.

Today the United States has the most extensive highway system in the world with about 2,000,000 miles of paved road. Napoleon realized the importance of roadway systems and built such a system in France which today has the second most extensive system of paved roadways in the world covering about 500,000 miles. Germany, Japan, Great Britain, India, and Australia also currently have systems of paved roads which extend well over 100,000 miles. In addition to these public roadways there are countless paved driveways and parking lots all over the world.

Today roads, highways, driveways and parking lots are often paved with asphalt concrete. Pavement can be made with asphalt concretes which are dust-free, smooth, and which offer the strength required for modern automobile and heavy truck traffic. Asphalt concrete is generally made by mixing aggregate (sand and gravel or crushed stone) with the proper quantity of an asphalt cement at an elevated temperature. The hot asphalt concrete is then placed by a layering machine or paver on the surface being paved and thoroughly rolled before the asphalt concrete mixture cools. The asphalt concrete is normally applied at a thickness varying from about 25 to about 100 millimeters.

Asphalt concrete pavements can be made to be very smooth which offers outstanding frictional resistance for vehicles operating thereon. Such asphalt concrete pavement can also be repaired simply by adding additional hot asphalt concrete to holes and other types of defects which develop in the surface. Asphalt concrete pavements can also be upgraded easily by adding additional layers of hot asphalt concrete to old surfaces which are in need of repair.

Even though asphalt concrete offers numerous benefits as a paving material, its use is not trouble free. One major problem encountered with asphalt concrete pavements is the loss of the adhesive bond between the aggregate surface and the asphalt cement. This breaking of the adhesive bond between the asphalt cement and the aggregate surface is known as "stripping". The stripping of asphalt binder from aggregate surfaces results in shorter pavement life and many millions of dollars of maintenance work on American highways each year. Reduction of this stripping tendency is of great interest when trying to improve conditions of roads and lowering these maintenance costs.

Over the years, various methods have been developed to reduce stripping tendencies. For instance, amines and lime are known to act as anti-stripping agents and are frequently applied to the surface of the aggregate prior to mixing it with the asphalt cement in making asphalt concrete. U.S. Pat. No. 5,219,901 discloses a technique for reducing stripping tendencies which involves coating the aggregate with a thin continuous film of a water-insoluble high molecular weight organic polymer, such as an acrylic polymer or a styrene-acrylic polymer.

U.S. Pat. No. 5,262,240 discloses a technique for providing aggregate with a high level of resistance to stripping by water, which comprises: (1) mixing the aggregate with latex to form a latex/aggregate mixture which is comprised of from about 0.005 weight percent to about 0.5 weight percent dry polymer; (2) heating the latex/aggregate mixture to a temperature which is within the range of about 66° C. to about 232° C.; (3) maintaining the latex/aggregate mixture at said elevated temperature for a time which is sufficient to reduce the moisture content of the latex/aggregate mixture below about 0.7 weight percent and to allow the polymer in the latex to crosslink on the surface of the aggregate to produce the coated aggregate.

At high service temperatures, such as those experienced on hot summer days, asphalt concrete can experience rutting and shoving. On the other hand, at low service temperatures, such as those experienced during cold winter nights, asphalt concrete can also experience low temperature cracking. To combat these problems it is known in the art to modify asphalt cements with rubbery polymers, such as styrene-butadiene rubber latex. Such modification techniques can greatly improve resistance to rutting, shoving, and low temperature cracking. However, the rubbery polymers used in such applications have a tendency to phase separate from hot asphalt cements due to poor compatibility. A solution to the problem of poor compatibility is offered by the technique disclosed in U.S. Pat. No. 5,002,987.

U.S. Pat. No. 5,002,987 relates to a modified asphalt cement containing from about 90 to about 99 parts by dry weight of an asphalt cement and from about 1 to about 10 parts by dry weight of a rubber latex having a weight average molecular weight of less than 250,000 and a Mooney viscosity of less than 50. The latex is a random polymer comprising from about 60 to 100 weight percent of at least one conjugated diolefin containing from 4 to 6 carbon atoms and from about 0 to 40 weight percent styrene. This latex polymer is highly compatible with the asphalt and provides good ductility which results in good resistance to low temperature cracking. However, the utilization of the rubbery polymers described in U.S. Pat. No. 5,002,987 in asphalt cements provide little improvement in elastic recovery or toughness. Thus, their use results in compromised rutting and shoving characteristics. There accordingly is a current need for a modifier which is compatible with asphalt cement and which improves the resistance of asphalt concrete made therewith to rutting, shoving, and low temperature cracking.

SUMMARY OF THE INVENTION

It has been determined that rubbery terpolymers of a conjugated diolefin monomer, a vinyl aromatic monomer, and isobutoxymethyl acrylamide (IBMA) can be used to modify asphalt cement to greatly enhance the resistance to shoving, rutting, and low temperature cracking of asphalt concretes made therewith. These rubbery polymers have a Mooney viscosity which is within the range of about 35 to about 80. It has further been determined that these rubbery terpolymers are compatible with virtually all types of asphalt. It is particularly preferred for the rubbery polymers of this invention to also contain repeat units which are derived from hydroxypropyl methacrylate (HPMA).

The present invention discloses a modified asphalt cement which is comprised of (1) from about 90 weight percent to about 99 weight percent of asphalt; and (2) from about 1 weight percent to about 10 weight percent of a rubbery polymer which is comprised of repeat units which are derived from (a) about 64 weight percent to about 84.9 weight percent of a conjugated diolefin monomer, (b) about 15 weight percent to about 33 weight percent of a vinyl aromatic monomer, and (c) about 0.1 weight percent to about 3 weight percent of isobutoxymethyl acrylamide.

The subject invention also reveals an asphalt concrete which is comprised of (A) from about 90 weight percent to about 99 weight percent of an aggregate, and (B) from about 1 weight percent to about 10 weight percent of a modified asphalt cement which is comprised of (1) from about 90 weight percent to about 99 weight percent of asphalt; and (2) from about 1 weight percent to about 10 weight percent of a rubbery polymer which is comprised of repeat units which are derived from (a) about 64 weight percent to about 84.9 weight percent of a conjugated diolefin monomer, (b) about 15 weight percent to about 33 weight percent of a vinyl aromatic monomer, and (c) about 0.1 weight percent to about 3 weight percent of isobutoxymethyl acrylamide.

The subject invention further discloses a latex which is particularly useful for modifying asphalt cements which is comprised of water and a rubbery polymer which is comprised of repeat units which are derived from (a) about 64 weight percent to about 84.9 weight percent of a conjugated diolefin monomer, (b) about 15 weight percent to about 33 weight percent of a vinyl aromatic monomer, and (c) about 0.1 weight percent to about 3 weight percent of isobutoxymethyl acrylamide; wherein said latex has a solids content which is within the range of about 30 weight percent to about 75 weight percent. It is generally preferred for the latex to have a solids content which is within the range of about 50 weight percent to about 70 weight percent.

DETAILED DESCRIPTION OF THE INVENTION

The rubbery polymer which is used to modify asphalt cement in accordance with this invention is made by emulsion polymerization. In the emulsion polymerization technique employed at least one conjugated diolefin monomer, at least one vinyl aromatic monomer and N-(isobutoxymethyl) acrylamide (IBMA) are terpolymerized in an aqueous polymerization medium to make a latex of the rubbery polymer. The rubbery polymer will typically have a Mooney viscosity which is within the range of about 35 to about 80. It is generally preferred for the rubbery polymer to have a Mooney viscosity which is within the range of about 40 to about 70 with Mooney viscosities within the range of about 50 to about 60 being most preferred. It is normally also preferred to further polymerize hydroxypropyl methacrylate (HPMA) monomer into the rubbery polymer.

The conjugated diolefin monomers which can be used contain from 4 to about 8 carbon atoms. The preferred conjugated diolefin monomers are 1,3-butadiene and isoprene. For economic reasons, 1,3-butadiene monomer is normally preferred. A wide variety of vinyl aromatic monomers can be used with styrene and α-methylstyrene being preferred.

In synthesizing the latex of rubbery polymer from about 64 weight percent to about 99.9 weight percent of the conjugated diolefin monomer, from 0 weight percent to about 33 weight percent of the vinyl aromatic polymer, and from about 0.1 weight percent to about 3 weight percent IBMA will be terpolymerized. As a general rule, from about 64 weight percent to about 84.9 weight percent of the conjugated diolefin monomer, from about 15 weight percent to about 33 weight percent of the vinyl aromatic polymer, and from about 0.1 weight percent to about 3 weight percent IBMA will be terpolymerized in synthesizing the latex of rubbery polymer. It is preferred for the monomeric charge composition to contain from about 72.5 weight percent to about 81.8 weight percent of the conjugated diolefin monomer, from about 18 weight percent to about 26 weight percent of vinyl aromatic monomers, and from about 0.2 weight percent to 1.5 weight percent IBMA.

It is beneficial to include HPMA in the monomer charge composition to improve the performance characteristics of the rubbery polymer as an asphalt modifier. In cases where HPMA is included in the polymer the level of IBMA needed is reduced. For instance, in cases where HPMA is employed the preferred monomer charge composition will contain from about 71 weight percent to about 81.5 weight percent of the conjugated diolefin monomer, from about 18 weight percent to about 26 weight percent of vinyl aromatic monomers, from about 0.3 weight percent to 1.0 weight percent IBMA, and from about 0.2 weight percent to about 2 weight percent HPMA. It is most preferred for HPMA containing monomeric charge compositions to contain from about 71.7 weight percent to about 81 weight percent of the conjugated diolefin monomer, from about 18 weight percent to about 26 weight percent of vinyl aromatic monomers, from about 0.4 weight percent to 0.8 weight percent IBMA, and from about 0.6 weight percent to about 1.5 weight percent HPMA. The weight ratio of HPMA to IBMA employed can vary greatly but will generally be within the range of about 0.5:1 to 4:1. It is normally preferred for the weight ratio of HPMA to IBMA to be within the range of 1:1 to 3:1. It is typically more preferred for the weight ratio of HPMA to IBMA to be within the range of 5:4 to 7:4 with a weight ratio of HPMA to IBMA of about 3:2 being most preferred.

The latex of rubbery polymer utilized in accordance with this invention can be synthesized using conventional emulsion polymerization techniques. The principles of emulsion polymerization are discussed in references such as "Synthetic Rubber" by G. S. Whitby, Editor-in-Chief, John Wiley and Sons, 1954, particularly Chapter 8, and "Emulsion Polymerization" by F. A. Bovey et al, Vol. IX of "High Polymers", Interscience Publishers, Inc., 1955. Some specialized applications of these principles are indicated in United States Patents, such as U.S. Pat. Nos. 3,080,334; 3,222,334; 3,223,663; 3,468,833 and 3,099,650. The teachings of all of these references which relate to emulsion polymerization are incorporated herein by reference in there entirety.

The emulsion polymerizations used in synthesizing the latex of this invention generally utilize a charge composition which is comprised of water, one or more conjugated diolefin monomers, one or more vinyl aromatic monomers, IBMA, an initiator, and an emulsifier (soap). Such polymerizations can be conducted over a very wide temperature range from about 0° C. to as high as about 100° C. Such emulsion polymerizations are typically conducted at a temperature which is within the range of about 5° C. to about 60° C.

The emulsifiers used in such polymerizations may be charged at the outset of the polymerization or may be added incrementally or proportionately as the reaction proceeds. Anionic, cationic or nonionic emulsifiers may be employed.

The emulsion polymerizations used in synthesizing the rubbery polymers of this invention may be initiated using free radical catalysts, ultraviolet light, or radiation. To insure a satisfactory polymerization rate, uniformity, and a controllable polymerization, free radical initiators are generally used with good results. Free radical initiators which are commonly used include the various peroxygen compounds such as potassium persulfate, ammonium persulfate, benzoyl peroxide, hydrogen peroxide, di-t-butylperoxide, dicumyl peroxide, 2,4-dichlorobenzoyl peroxide, decanoyl peroxide, lauroyl peroxide, cumene hydroperoxide, p-menthane hydroperoxide, t-butylhydroperoxide, acetyl acetone peroxide, methyl ethyl ketone peroxide, succinic acid peroxide, dicetyl peroxydicarbonate, t-butyl peroxyacetate, t-butyl peroxymaleic acid, t-butyl peroxybenzoate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, and the like; the various alkyl perketals, such as 2,2-bis-(t-butylperoxy)butane, ethyl 3,3-bis(t-butylperoxy)butyrate, 1,1-di-(t-butylperoxy) cyclohexane, and the like.

Free radical initiators generally perform more effectively when used in polymerization recipes containing appropriate levels of supporting ingredients. By "supporting ingredients" is meant those materials often referred to as activators in emulsion, or other systems, where required. U.S. Pat. No. 3,080,334 describes some of these materials at column 5, lines 20–26. Such materials can also be referred to as catalyst activators. The term "redox polymerization" is often used where the complete initiator system includes a Redox system, i.e., reducing agents and oxidizing agents in a proportion that yields polymerization initiating species. All of these initiator systems are well known in the art and can be utilized in practicing the present invention.

Emulsion polymerizations are normally accomplished in the range of 5° C. to 90° C. Though the activator or "Redox" initiated systems are preferred for low temperature polymerizations, they are very effective at high temperatures also, normally requiring appreciably lower quantities of the various ingredients to obtain a desirable polymerization rate.

The emulsion polymerization system used in the synthesis of the latex can be treated at the desired degree of conversion with shortstopping agents, such as hydroquinone. Typical stabilizing agents and standard antioxidants can also be added to the latex.

Asphalt cement can be modified with the latex of the rubbery polymer by simply mixing the latex into hot asphalt. The latex of the rubbery polymer may be added to the asphalt in an amount of from about 1 to about 10 parts by dry weight of the latex. Preferably, from about 1 to about 6 parts by dry weight is used with a range of from about 2 to about 4 parts being particularly preferred.

The rubber latex is slowly added to heated asphalt with agitation. The asphalt is generally heated to a temperature ranging from about 150° C. to about 170° C. At the elevated temperatures used the water in the latex quickly evaporates leaving only the rubbery polymer which was in the latex. After the rubber latex has been thoroughly mixed with the asphalt cement, one should store the modified asphalt cement at elevated temperatures to avoid solidification prior to use.

Asphalt is defined by ASTM as a dark brown to black cementitious material in which the predominant constituents are bitumens that occur in nature or are obtained in petroleum processing. Asphalts characteristically contain very high molecular weight hydrocarbons called asphaltenes. These are essentially soluble in carbon disulfide, and aromatic and chlorinated hydrocarbons. Bitumen is a generic term defined by ASTM as a class of black or dark colored (solid, semi-solid or viscous) cementitious substances, natural or manufactured, composed principally of high molecular weight hydrocarbons, of which asphalts, tars, pitches, asphaltites are typical. ASTM further classifies asphalts or bituminous materials as solids, semi-solids, or liquids using a penetration test for consistency or viscosity. In this classification, solid materials are those having a penetration at 25° C. under a load of 100 grams applied for 5 seconds, of not more than 10 decimillimeters (1 millimeter). Semi-solids are those having a penetration at 25° C. under a load of 100 grams applied for 5 seconds of more than 10 decimillimeters (1 millimeter), and a penetration at 25° C. under a load of 50 grams applied for 1 second of not more than 35 millimeters. Semi-solid and liquid asphalts predominate in commercial practice today.

Asphalts are usually specified in several grades for the same industry, differing in hardness and viscosity. Specifications of paving asphalt cements generally include five grades differing in either viscosity level at 60° C. or penetration level. Susceptibility of viscosity to temperatures is usually controlled in asphalt cement by its viscosity limits at a higher temperature such as 135° C. and a penetration or viscosity limit at a lower temperature such as 25° C. For asphalt cements, the newer viscosity grade designation is the mid-point of the viscosity range.

The asphalt materials which may be used in the present invention are those typically used for road paving, repair and maintenance purposes. Petroleum asphalts are the most common source of asphalt cements. Petroleum asphalts are produced from the refining of petroleum and used predominantly in paving and roofing applications. Petroleum asphalts, compared to native asphalts, are organic with only trace amounts of inorganic materials. Some representative examples of asphalt cements that may be used in the present invention have an ASTM grade of AC-2.5, AC-5, AC-10, AC-20 and AC-40. The preferred asphalt cements include AC-5, AC-10 and AC-20.

In addition to the rubbery polymer and the asphalt cement, the modified asphalt cement of the present invention may contain other conventional additives. Examples of conventional additives include antistripping compounds, fibers, release agents, and fillers. Some specific examples of additives which can be employed include kaoline clay, calcium carbonate, bentonite clay, sanders dust, and cellulose fibers.

After the asphalt cement has been modified it can be mixed with aggregate to make asphalt concrete using standard equipment and procedures utilized in making asphalt concrete. As a general rule, from about 1 weight percent to about 10 weight percent of the modified asphalt cement and from about 90 weight percent to about 99 weight percent aggregate will be included in the asphalt concrete. It is more typical for the asphalt concrete to contain from about 3 weight percent to about 8 weight percent of the modified asphalt cement and from about 92 weight percent to about 97 weight percent of the aggregate. It is normally preferred for the asphalt concrete to contain from about 4 weight percent to about 7 weight percent of the modified asphalt cement and from about 93 weight percent to about 96 weight percent of the aggregate.

The coated aggregate is mixed with the asphalt to attain an essentially homogeneous asphalt concrete. The coated aggregate is mixed with the asphalt cement utilizing conventional techniques and standard equipment. For instance, the aggregate can be dried and mixed with asphalt to produce asphalt concrete on a continuous basis in a standard mixer.

Standard aggregate can be utilized in the practice of this invention. The aggregate is essentially a mixture containing rocks, stones, crushed stone, gravel, and/or sand. The aggregate will typically have a wide distribution of particle sizes ranging from dust to golf ball size. The best particle size distribution varies from application to application. In many cases it will be advantageous to coat the aggregate with latex in accordance with the teachings of U.S. Pat. No. 5,262,240 to improve resistance to stripping by water.

The asphalt concrete made using the modified asphalt cement of this invention can then be used to pave roads, highways, exit ramps, streets, driveways, parking lots, airport runways, or airport taxiways utilizing conventional procedures. However, pavements made utilizing the asphalt concretes of this invention offer resistance to rutting, shoving, and low temperature cracking. Additionally, they can be applied without encountering processing difficulties due to the latex used for the modification being incompatible with the asphalt.

This invention is illustrated by the following examples which are merely for the purpose of illustration and are not to be regarded as limiting the scope of the invention or the manner in which it can be practiced. Unless specifically indicated otherwise all parts and percentages are given by weight.

EXAMPLE 1

In this experiment a latex was made by terpolymerizing 1,3-butadiene monomer, styrene, and IBMA. In the procedure employed 70 parts of 1,3-butadiene, 30 parts of styrene and 0.6 parts of IBMA were charged into a quart polymerization bottle containing water and potassium oleate soap. A conventional iron/sodium formaldehyde sulfoxylate activated hydroperoxide initiator system was employed and t-dodecyl mercaptan was utilized as a modifier. The polymerization was carried out at a temperature of 18° C. (65° F.) and was shortstopped at a monomer conversion of 65–70%. The latex made was then concentrated on a rotary evaporator under vacuum. A sample of the rubbery polymer made was determined to have a Mooney ML-4 viscosity of 56.

EXAMPLE 2

The procedure employed in Example 1 was repeated in this experiment except the level of IBMA was increased to 1.5 parts. A sample of the rubbery polymer made was determined to have a Mooney ML-4 viscosity of 57.

EXAMPLES 3–7

In this series of experiments various latices were evaluated as modifiers for Star AC-10 asphalt. Example 3 was carried out as a control and was not modified with latex. In Example 4 the asphalt cement was modified with the latex made in Example 1. The asphalt cement of Example 5 was modified with the latex made in Example 2. Example 6 was a control wherein a standard styrene-butadiene rubber latex having a Mooney ML-4 viscosity of 130 was used to modify the asphalt cement. Example 7 was also a control wherein a styrene-butadiene rubber latex of the type described in U.S. Pat. No. 5,002,987 having a low Mooney ML-4 viscosity of about 12 was used to modify the asphalt cement.

In the procedure used the latices being evaluated were slowly added to hot asphalt cement under propeller agitation at moderate speeds. The latices were added in amounts sufficient to attain a dry weight of rubbery polymer in the asphalt cements of 3%. This was followed by 15 minutes of high speed agitation with a Ross high shear emulsifier/mixer. The modified asphalt cements were then held for about 25 minutes in an oven which was maintained at a temperature of about 163° C. (325° F.).

The physical properties of the modified asphalt cements made were then determined using standard test procedures. The strength and flexibility of the asphalt binder cement at moderate or low temperatures are measured by force ductility, toughness, and tenacity. These properties measure the resistance to deformation. Increasing strength and toughness gives greater resistance to surface abrasion and wear, and provides better retention of aggregate. Ductility was determined by ASTM D113.

Compatibility was determined by visual inspection after holding the asphalt cement for 24 hours at a temperature of 163° C. to allow for separation. A rating of 1 represents the worst compatibility and a 5 rating of 10 represents the best level of compatibility. The dynamic rheological value of G*/Sin Delta was proposed by the government-funded Strategic Highway Research Program (SHRP) for defining the high-temperature stiffness of asphalt binders. The dynamic evaluations of the modified asphalts shown in Table I were carried out at a temperature of 64° C. The ductility, toughness, tenacity, compatibility, and G*/Sin Delta of the modified asphalt cements are reported in Table I. Ductility was determined at a temperature of 4° C. with toughness and tenacity being determined at a temperature of 25° C.

TABLE I

| Example | 3 | 4 | 5 | 6 | 7 |
| --- | --- | --- | --- | --- | --- |
| Ductility, cm | 8.5 | 150 | 150 | 150 | 150 |
| Toughness, lb-in. | 17.7 | 33.6 | 39.2 | 40.3 | 18.5 |
| Tenacity, lb-in. | 4.3 | 14.2 | 22.9 | 21.6 | 5.8 |
| Compatibility | — | 8 | 8 | 4 | 9.5 |
| G*/Sin Delta, Pa | — | 4357 | 3846 | 4197 | 3099 |

Table I shows that asphalt cements can be modified with the latices of this invention to improve compatibility, toughness, and tenacity (see Examples 4 and 5). This is in contrast to the utilization of standard high Mooney polymers which are capable of improving toughness and tenacity, but which are not very compatible with asphalt (see Example 6). It is also in contrast to the employment of standand latices of low Mooney viscosity polymers which are compatible with asphalt but which do not improve toughness and tenacity (see Example 7).

In asphalt pavements improved toughness and tenacity translate into improved resistance to rutting and shoving. It is accordingly important for the latex utilized in modifying asphalt cements to be compatible with the asphalt and for it to improve toughness and tenacity. This highly desirable combination of properties is attained in Examples 4 and 5 which utilize the latices of this invention.

EXAMPLES 8

In this experiment a latex was made by polymerizing 1,3-butadiene monomer, styrene, HPMA, and IBMA. In the procedure employed 70 parts of 1,3-butadiene, 30 parts of styrene, 1.3 parts of HPMA, and 0.8 parts of IBMA were charged into a quart polymerization bottle containing water and potassium oleate soap. A conventional iron/sodium formaldehyde sulfoxylate activated hydroperoxide initiator system was employed and t-dodecyl mercaptan was utilized as a modifier. The polymerization was carried out at a temperature of 18° C. (65° F.) and was shortstopped at a monomer conversion of about 70%. The latex made was then concentrated on a rotary evaporator under vacuum.

EXAMPLE 9

The procedure employed in Example 8 was repeated in this experiment except the level of HPMA was reduced to 0.9 parts.

EXAMPLES 10-14

In this series of experiments various latices were evaluated as modifiers for Ergon AC-20 asphalt. Example 10 was carried out as a control and was not modified with latex. In Example 13 the asphalt cement was modified with the latex made in Example 8. The asphalt cement of Example 14 was modified with the latex made in Example 9. Example 11 was a control wherein a standard styrene-butadiene rubber latex having a Mooney ML-4 viscosity of 130 was used to modify the asphalt cement. Example 12 was also a control wherein a styrene-butadiene rubber latex of the type described in U.S. Pat. No. 5,002,987 having a low Mooney ML-4 viscosity of about 12 was used to modify the asphalt cement.

In the procedure used the latices being evaluated were slowly added to hot asphalt cement under propeller agitation at moderate speeds. The latices were added in amounts sufficient to attain a dry weight of rubbery polymer in the asphalt cements of 3%. This was followed by 15 minutes of high speed agitation with a Ross high shear emulsifier/ mixer. The modified asphalt cements were then held for about 25 minutes in an oven which was maintained at a temperature of about 325° F.

The physical properties of the modified asphalt cements made were then determined using standard test procedures. The strength and flexibility of the asphalt binder cement at moderate or low temperatures are measured by force ductility, toughness, and tenacity. These properties measure the resistance to deformation. Increasing strength and toughness gives greater resistance to surface abrasion and wear, and provides better retention of aggregate. Higher elastic recovery (greater than 50%) is indicative of reduced rutting by virtue of exhibiting better recovery from deformation.

Compatibility was determined by visual inspection after holding the asphalt cement for 24 hours at a temperature of 163° C. to allow for separation. A rating of 1 represents the worst compatibility and a rating of 10 represents the best level of compatibility. The force ductility at 800% elongation, elastic recovery, toughness, tenacity, and compatibility of the modified asphalt cements are reported in Table II. The elastic recovery values reported in Table II were determined at a temperature of 10° C.

TABLE II

| Example | 10 | 11 | 12 | 13 | 14 |
|---|---|---|---|---|---|
| Force Duct. (lbs.) | 0.85 | 0.93 | 0.60 | 0.94 | 0.91 |
| Toughness, lb-in. | 33.5 | 77.3 | 42.0 | 80.3 | 67.7 |
| Tenacity, lb-in. | 12.4 | 35.5 | 13.9 | 41.6 | 36.3 |
| Compatibility | — | 4 | 10 | 9 | 10 |
| Elastic Recovery, % | 8.8 | 52.0 | 31.0 | 60.0 | 59.0 |

Table II shows that asphalt cements can be modified with the latices of this invention to improve compatibility, toughness, elastic recovery and tenacity (see Examples 13 and 14). This is in contrast to the utilization of standard high Mooney polymers which are capable of improving toughness, elastic recovery, and tenacity, but which are not very compatible with asphalt (see Example 11). It is also in contrast to the employment of standard latices of low Mooney viscosity polymers which are compatible with asphalt but which do not improve toughness and tenacity (see Example 12). Only the latices of this invention could modify the asphalt cement to improve toughness and tenacity without being incompatible.

While certain representative embodiments and details have been shown for the purpose of illustrating the subject invention, it will be apparent to those skilled in this art that various changes and modifications can be made therein without departing from the scope of the subject invention.

What is claimed is:

1. A latex which is particularly useful for modifying asphalt cements which is comprised of water, an emulsifier and a rubbery polymer which is comprised of repeat units which are derived from (a) about 71 weight percent to about 81.5 weight percent of 1,3-butadiene monomer, (b) about 18 weight percent to about 26 weight percent of styrene, (c) about 0.3 weight percent to about 1 weight percent of N-(isobutoxymethyl) acrylamide and (d) about 0.2 weight percent to about 2 weight percent hydroxypropyl methacrylate; wherein said latex has a solids content which is within the range of about 30 weight percent to about 75 weight percent.

2. A latex as specified in claim 1 wherein the weight ratio of hydroxypropyl methacrylate to N-(isobutoxymethyl) acrylamide is within the range of about 0.5:1 to about 4:1.

3. A latex as specified in claim 2 wherein the rubbery polymer is comprised of repeat units which are derived from about 71.7 weight percent to about 81 weight percent of 1,3-butadiene monomer, from about 18 weight percent to about 26 weight percent of styrene monomers, from about 0.4 weight percent to 0.8 weight percent N-isobutoxymethyl acrylamide, and from about 0.6 weight percent to about 1.5 weight percent hydroxypropyl methacrylate.

4. A latex as specified in claim 1 wherein the weight ratio of hydroxypropyl methacrylate to N-(isobutoxymethyl) acrylamide is within the range of about 1:1 to about 3:1.

5. A latex as specified in claim 4 wherein the latex has a solids content which is within the range of about 50 percent and about 70 percent.

6. A latex as specified in claim 5 wherein the weight ratio of hydroxypropyl methacrylate to N-(isobutoxymethyl) acrylamide is within the range of about 5:4 to about 7:4.

7. A latex as specified in claim 6 wherein the rubbery polymer has a Mooney viscosity which is within the range of about 35 to about 80.

* * * * *